United States Patent
Nabuurs

(10) Patent No.: US 10,012,249 B2
(45) Date of Patent: Jul. 3, 2018

(54) CONSTRUCTIONAL ASSEMBLY AND METHOD FOR MAKING IT

(71) Applicant: Inalfa Roof Systems Group B.V., Venray (NL)

(72) Inventor: Martinus Wilhelmus Maria Nabuurs, Overloon (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 356 days.

(21) Appl. No.: 14/500,121

(22) Filed: Sep. 29, 2014

(65) Prior Publication Data

US 2015/0093186 A1 Apr. 2, 2015

(30) Foreign Application Priority Data

Oct. 1, 2013 (EP) .................................... 13186875

(51) Int. Cl.
  *B25G 3/34* (2006.01)
  *F16B 11/00* (2006.01)
  (Continued)

(52) U.S. Cl.
  CPC .......... *F16B 1/00* (2013.01); *B29C 45/14377* (2013.01); *B29C 45/14434* (2013.01);
  (Continued)

(58) Field of Classification Search
  CPC .......... Y10T 403/472; Y10T 29/49982; Y10T 29/49885; Y10T 29/49888;
  (Continued)

(56) References Cited

U.S. PATENT DOCUMENTS 4,723,809 A * 2/1988 Kida ...................... B60J 10/70
                                              296/201
4,738,482 A * 4/1988 Bohm ..................... B60J 10/82
                                              296/201
(Continued)

FOREIGN PATENT DOCUMENTS

DE         20006238 U1    5/2001
DE         20220154 U1    2/2004
(Continued)

OTHER PUBLICATIONS

European Search Report dated Apr. 16, 2014 for corresponding European Application No. 13186875.4, filed Oct. 1, 2013.

*Primary Examiner* — Amber Anderson
*Assistant Examiner* — Nahid Amiri
(74) *Attorney, Agent, or Firm* — Steven M. Koehler; Westman, Champlin & Koehler, P.A.

(57) ABSTRACT

An assembly of a first and second constructional part is provided, wherein the first constructional part has a first end and an opposite second end connected by a central part extending substantially perpendicularly to a surface of the second constructional part. The first end of the first constructional part is connected to said surface of the second constructional part with an encapsulating material at least partly surrounding said first end and adhering to said surface of the second constructional part. The first constructional part between its first and second ends is provided with at least one protruding part. The first constructional part in contact the encapsulating material is provided with a flange of which the vertical projection on said surface of the second constructive part completely covers the vertical projection of the protruding part on said surface. A method for making the assembly is provided.

9 Claims, 3 Drawing Sheets

(51) Int. Cl.
*F16L 13/00* (2006.01)
*F16B 12/04* (2006.01)
*F16B 1/00* (2006.01)
*B32B 37/12* (2006.01)
*B29C 45/14* (2006.01)

(52) U.S. Cl.
CPC .... *B32B 37/1284* (2013.01); *B29C 45/14418* (2013.01); *B29C 2045/1454* (2013.01); *Y10T 403/472* (2015.01)

(58) Field of Classification Search
CPC ........ B29C 45/14377; B29C 45/14418; B29C 45/14434; B29C 2045/1454; B32B 37/1284; B60J 7/043; B60J 7/0576; F16B 1/00; A47B 47/0066; A47B 47/042
USPC ...... 403/267; 312/404, 263, 265.5; 264/261, 264/274, 275; 296/213
See application file for complete search history.

(56) References Cited

U.S. PATENT DOCUMENTS

| | | | | |
|---|---|---|---|---|
| 5,273,354 A * | 12/1993 | Herrmann | ............ | A47B 96/025 312/408 |
| 5,466,508 A * | 11/1995 | Brocke | .................... | B60J 10/82 296/216.09 |
| 5,540,493 A | 7/1996 | Kane et al. | | |
| 5,564,809 A * | 10/1996 | Kane | ..................... | A47B 57/16 211/193 |
| 5,705,113 A | 1/1998 | Kane | | |
| 5,738,880 A | 4/1998 | Kane et al. | | |
| 6,079,771 A * | 6/2000 | Brandner | ................. | B60J 10/82 200/61.43 |
| 6,273,500 B1 * | 8/2001 | Boersma | .................. | B60J 10/82 296/216.09 |
| 6,334,646 B1 * | 1/2002 | Oami | ...................... | B60R 13/07 296/213 |
| 6,494,529 B1 * | 12/2002 | Manders | .................... | B60J 7/02 296/221 |
| 6,540,289 B2 * | 4/2003 | Bergmiller | ............ | B29C 44/385 296/216.09 |
| 7,048,327 B2 * | 5/2006 | Mack | ........................ | B60J 10/82 296/213 |
| 7,063,378 B2 * | 6/2006 | Bott | ....................... | B29C 44/1271 296/216.09 |
| 7,359,212 B2 * | 4/2008 | Mayuzumi | ............ | H05K 3/284 361/760 |
| 7,794,008 B2 * | 9/2010 | Hall | ........................ | B60J 5/0434 296/153 |
| 7,950,755 B2 * | 5/2011 | Vardon | ................... | F25D 25/02 312/408 |
| 8,182,025 B2 * | 5/2012 | Auchter-Bruening | ..... | B60J 7/04 296/191 |
| 2004/0160090 A1 * | 8/2004 | Teschner | ........... | B32B 17/10018 296/211 |
| 2010/0104803 A1 * | 4/2010 | Nakagawa | ........ | B29C 45/14377 428/138 |
| 2011/0186248 A1 * | 8/2011 | Lefevre | ................ | A47B 96/062 108/108 |
| 2012/0292951 A1 * | 11/2012 | De Bie | ............. | B29C 45/14836 296/216.09 |

FOREIGN PATENT DOCUMENTS

| | | |
|---|---|---|
| EP | 0683366 A1 | 11/1995 |
| EP | 0701098 A2 | 3/1996 |
| JP | 2011031453 A | 2/2011 |

* cited by examiner

CONSTRUCTIONAL ASSEMBLY AND METHOD FOR MAKING IT

BACKGROUND

The discussion below is merely provided for general background information and is not intended to be used as an aid in determining the scope of the claimed subject matter.

Aspects of the invention relate to an assembly of a first and second constructional part, wherein the first constructional part has a first end and an opposite second end connected by a central part extending substantially perpendicularly to a surface of the second constructional part, wherein the first end of the first constructional part is connected to said surface of the second constructional part by means of an encapsulating material at least partly surrounding said first end and adhering to said surface of the second constructional part and wherein the first constructional part between its first and second ends is provided with at least one protruding part.

The manufacture of such an assembly of first and second constructional parts may comprise the following steps: positioning the first end of the first constructional part onto or near to the surface of the second constructional part, engaging the first constructional part near to its first end in a sealing manner with a sealing tool for (mostly with other additional tooling) creating a receiving space for the encapsulating material, supplying into said receiving space between said tool and the surface of the second constructional part the encapsulating material which will surround the respective part of the first constructional part for securely adhering it to the surface of the second constructional part and finally, after the encapsulating material has cured or otherwise solidified sufficiently, removing the sealing tool.

The application and removal of the sealing tool in many cases is hindered by the protruding part of the first constructional part. One possible remedy could be that the protruding part is provided after the first and second constructional parts have been connected in the above manner. This, however, only is possible if the protruding part allows to be provided onto the first constructional part at such later stage, for example when the protruding part is connected to the first constructional part through releasable fasteners, e.g. screws, bolts or alike (which also allows to remove a protruding part of a previously manufactured first constructional part at an earlier stage), or if the protruding part can be permanently connected to the first constructional part at such later stage by means of an appropriate process, for example overmolding (which means that a molding material is injected around both parts). In both instances, however, the complexity (and thus cost) of the manufacture is increased.

Alternatively the sealing tool could be adapted to allow it to move past the protruding part without being hindered by it, for example when the protruding part is an integral part of the first constructional part which cannot be removed temporarily or be provided at a later stage. The sealing tool, for example, could comprise multiple parts movable relative to each other. Such a complicated sealing tool however would substantially increase the cost of manufacture, compared to a situation in which a basically one-part sealing tool simply would slide along the first constructional part towards or away from its sealing position. Moreover, such a multiple-part sealing tool offers an increased risk of leakage of the encapsulating material.

In practice the presence of such at least one protruding part often leads to a situation in which the manufacture of the assembly is not carried out in the above manner with the use of an encapsulating material, but simply by using an adhesive to connect the first constructional part to the second constructional part. This, however, has the disadvantage that the strength, reliability and durability of the connection between both parts (and thus the quality of the obtained assembly) may be reduced.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In accordance with an aspect of the present invention an assembly, the first constructional part in contact with the encapsulating material is provided with a flange of which the vertical projection on said surface of the second constructive part completely covers the vertical projection of the protruding part on said surface.

It is noted that such a flange may be provided all around the first constructional part, or only on one side thereof or even only at specified distinct locations. As a consequence some parts of the corresponding vertical projection may be caused by the first constructional part itself (for example if the first constructional part has a flange on one side only which causes one part of the projection, whereas the cross section of the first constructional part causes the remaining part of such a projection). The same applies for the projection caused by the combination of protruding part and first constructional part.

As a result of such a configuration with flange, a sealing tool can slide or move beyond the protruding part and can engage the flange and first constructive part in a good sealing manner. A multi-part sealing tool is not needed nor the use of a manufacturing process in which the protruding part is provided after the encapsulating step (possibly after being removed before said step). A simple one-part sealing tool may be used irrespective the presence and/or shape of protruding parts. Basically, now, the flange together with the sealing tool defines part of the boundary of the receiving space for the encapsulating material.

In a preferred embodiment of the assembly, the projection of the flange on said surface is larger than the projection of the protruding part on said surface. This avoids any contact between the sealing tool (especially its sealing members which often are very flexible and thus rather fragile) and the protruding part or parts when the sealing tool moves towards or away from its sealing position.

The above however does not preclude the possibility that both projections closely match each other.

In one special embodiment of the assembly, the protruding part is a separate part connected to the first constructional part, wherein the flange is formed as an extension of said separate part.

In such an embodiment a part already present (the protruding part) is amended in such a way that it also defines the flange. This allows the protruding part and flange to be manufactured simultaneously as a separate part that is connected to the first constructional part through an appropriate technique, for example by overmolding.

As an alternative it also is conceivable that the flange is an integral part of the first constructional part, being formed of a single unitary body. The first constructional part and flange than in most cases are made of the same material (although a 2K injection molding technique might be applied too). The first constructional part also may be deformed locally (e.g. bending) for realising the flange.

Preferably the flange defines a contour comprising a number of substantially straight lines, for example a rectangular or square contour. This results in an optimal sealing engagement between the sealing tool and the flange. Other contours (such as polygons) are possible too, as long as no strong curvatures are present.

In a practical embodiment, the assembly defines part of an open roof construction for a vehicle in which the first constructional part is a bracket and the second constructional part is a glass panel.

Such a bracket may be part of a moving mechanism for moving parts of the open roof construction (for example the glass panel) or may serve as a connection therefor.

In such a case, the bracket at its first end may comprise a first leg extending substantially in parallel to the surface of the glass panel and encapsulated by the encapsulating material, and a second leg connected to the first leg defining its central part, wherein said second leg is provided with the at least one protruding part which, in some embodiments, may define at least one part of a moving mechanism.

In a special embodiment, the at least one protruding part is defined by an undulated shape of the second leg, as seen in a transverse cross section (thus a cross section in parallel to the surface of the glass panel) of the second leg.

When the protruding part is defined by an undulating shape or contour of the second leg (of the first constructional part) the engagement between the sealing tool and the first constructional part may not be optimal (especially at strongly curved sections of the undulations) with an increased risk of leaking out of encapsulating material. Even when such undulations run in the lengthwise direction of the first constructional part (perpendicularly to the surface of the second constructional part) such that the first constructional part has a constant transverse cross section at different lengthwise positions and the sealing tool thus simply could slide along the first constructional part, the same problem of leakage could occur. In such a case the flange will allow to mitigate or even eliminate such problems, especially when it has the above mentioned contour with straight lines.

The invention correspondingly applies to assemblies in which a number of first constructional parts are attached to a single second constructional part.

In a second aspect, the invention relates to a method for making an assembly comprising a first constructional part having at least one protruding part and a second constructional part having a surface to which the first constructional part is connected by means of an encapsulating material. The method comprises the step of providing the first constructional part with a flange at a position intended to be in contact with the encapsulating material, of which flange the vertical projection on said surface of the second constructive part at least completely covers the vertical projection of the protruding part on said surface, the step of positioning a first end of the first constructional part onto or near to said surface of the second constructional part, the step of engaging the first constructional part and its flange in a sealing manner with a sealer for creating a receiving space for the encapsulating material, the step of supplying into said receiving space between said sealer and the surface of the second constructional part the encapsulating material which will surround at least part of the first end of the first constructional part for securely adhering it to the surface of the second constructional part and finally, after the encapsulating material has cured sufficiently, the step of removing the sealer.

The present method allows to position and remove the sealer in an efficient manner, in correspondence with the previous explanations with respect to the assembly itself.

In one embodiment of the method, the step of providing a flange comprises connecting to the first constructional part a separate part of which an extension is formed as the flange. For example, said separate part may be connected to the first constructional part by overmolding.

In another embodiment the step of providing a flange is carried out already during the initial manufacture of the first constructional part, such that the flange will be an integral part of the first constructional part.

BRIEF DESCRIPTION OF THE DRAWINGS

Hereinafter aspects of the invention will be elucidated while referring to the drawings, in which:

FIG. 2b shows a schematic cross section according to II-II in FIG. 2a;

FIG. 6a shows a schematic cross section of a fourth embodiment of the assembly, and FIG. 6b shows a schematic cross section according to VI-VI in FIG. 6a.

DETAILED DESCRIPTION OF THE ILLUSTRATIVE EMBODIMENTS

Figure 1:
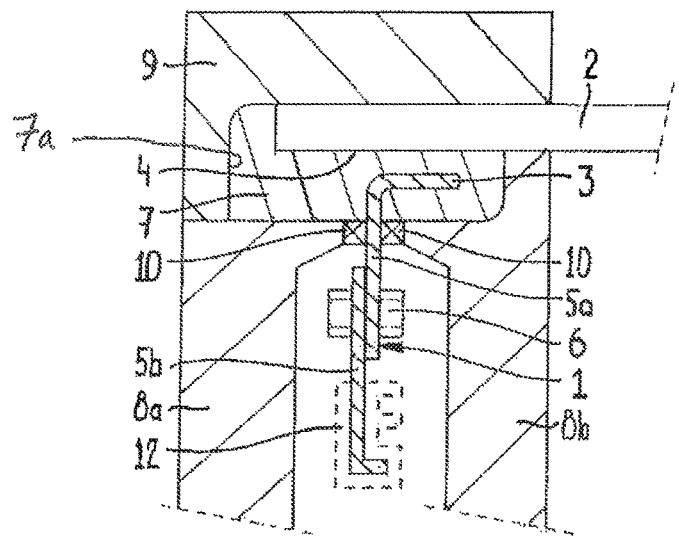
FIG. 1a shows a schematic cross section of a prior art portion of FIG. 1 in a lower position.

Firstly referring to FIG. 1 a state of the art assembly of a first constructional part 1 and a second constructional part 2 is illustrated. As will be the case for all the figures, as an example such an assembly defines part of an open roof construction for a vehicle in which the first constructional part 1 is a bracket and the second constructional part 2 is a glass panel (which may define or may be part of a moving panel for opening and closing a roof opening in a stationary roof part of the vehicle and which may cooperate with moving mechanisms which may comprise one or more brackets and/or which may be attached to the bracket or brackets). Most of the details of such an open roof construction and moving mechanism therefor are well known in the state of the art and do not need any further explanation here.

The bracket 1 at a first end comprises a first leg 3 extending substantially in parallel to a surface 4 of the glass panel 2. Between this first leg 3 and an opposite second end of the bracket 1 a central part is located which in the shown embodiment comprises two leg parts 5a and 5b together defining a second leg connected to the first leg 3 and extending substantially perpendicularly to said surface 4. The leg parts 5a and 5b are interconnected by a fastener 6 (for example a bolt and nut) which defines a protruding part which protrudes from the bracket 1.

The first leg 3 of the bracket 1 is connected to the surface 4 of the glass panel 2 by means of an encapsulating material 7 which surrounds the first leg 3 and adheres to said surface 4 of the glass panel 2.

Figure 1A:
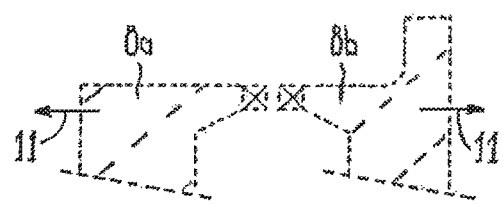

For correctly supplying the encapsulating material 7 a sealing tool having parts 8a,8b together with a counter tool 9 is used (which together may be referred to as sealer). The sealing tool parts 8a,8b are provided with sealing members 10 for engaging the bracket 1 and defining a sealed receiving cavity 7a for the encapsulating material 7 (which will be supplied through an appropriate supply channel, not illustrated but known per se). For allowing the sealing members 10 to be positioned against the bracket (by moving the sealing tool parts 8a,8b upward from a position indicated in dotted lines in FIG. 1a) the fastener 6 should be removed temporarily (complicating the procedure) or the sealing tool parts 8a,8b first should be moved apart according to arrows 11 in FIG. 1a (needing separate sealing tool parts 8a,8b contrary to integral sealing tool parts). Both solutions complicate the manufacture. The same problem occurs when the bracket 1 does not comprise a fastener 6, but other protruding parts, like an overmolded part 12.

Figure 2A:
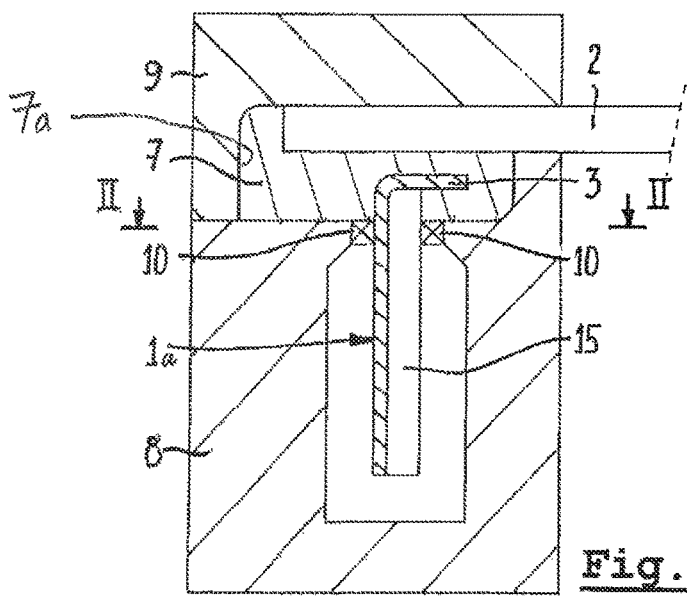
FIG. 2a shows a schematic cross section of a second state of the art assembly during manufacture.
Figure 2B:
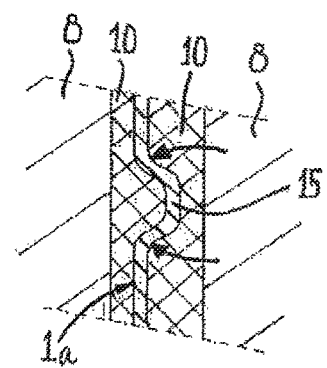

In the state of the art assembly illustrated in FIGS. 2a and 2b, the bracket 1a is provided with an undulation 15. Although the longitudinal shape of such an undulation 15 allows the use of a one-part sealing tool 8 with sealing members 10, problems (possible leakage) may occur where the sealing members 10 engage strongly curved parts (indicated by arrows in FIG. 2b) of the bracket 1a.

Figure 3:
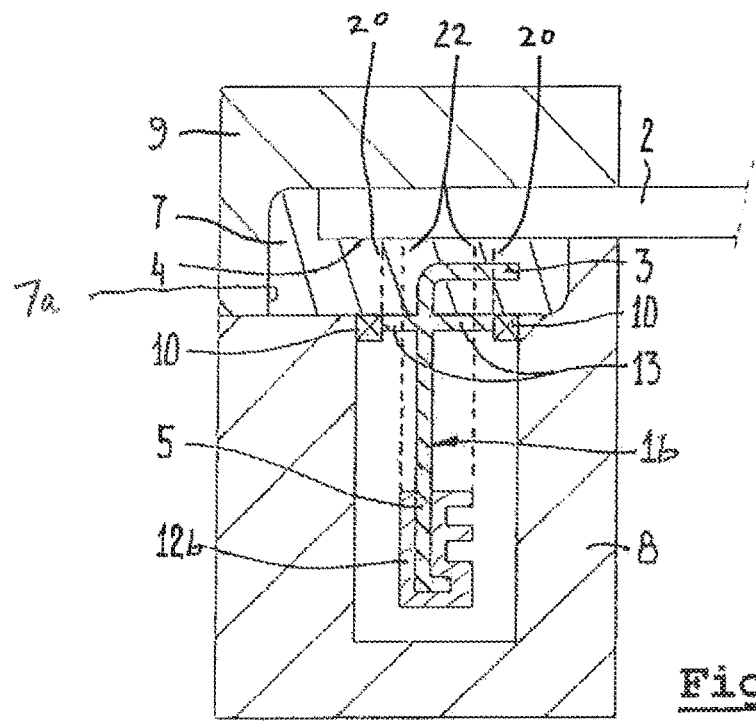
FIG. 3 shows a schematic cross section of a first embodiment of the assembly.

In FIG. 3 a first embodiment of an assembly is illustrated during manufacture. The bracket 1b comprises a one-part second leg 5 partially overmolded by an overmolded part 12b (which, for example, may define one or more curves for a moving mechanism). Adjacent the encapsulating material 7, the bracket 1b is provided with a flange 13 (which in the illustrated embodiment projects from opposite sides of the bracket 1b but which, depending on the shape of the overmolded part, also may project from just one side—see FIG. 5—or only parts of the circumference of the bracket 1b). The vertical projection of the combination of bracket 1b and flange 13 on the surface 4 of the glass panel 2 (schematically indicated by dotted lines 20 extending upward from the outer edges of the flange 13) is at least as large as (and in the illustrated embodiment larger than) the vertical projection of the combination of bracket 1 and overmolded part 12b on said surface 4 (likewise indicated schematically by dotted lines 22 extending upward from the outer boundaries of the overmolded part 12b). As a result the sealing tool parts 8a,8b may be combined into a one-part sealing tool 8 of which the sealing members 10 may be brought into a sealing engagement with the flange 13 (and, depending on the configuration and location of such a flange, other parts of the bracket 1) by moving the sealing tool 8 upwards from a starting position corresponding to the position indicated in dotted lines in FIG. 1 without the overmolded part 12b forming an obstruction for the passage of the sealing members 10. In the illustrated position of the sealing tool 8 the encapsulating material 7 will be supplied and after curing thereof the sealing tool 8 is moved downwards again.

Figure 4:
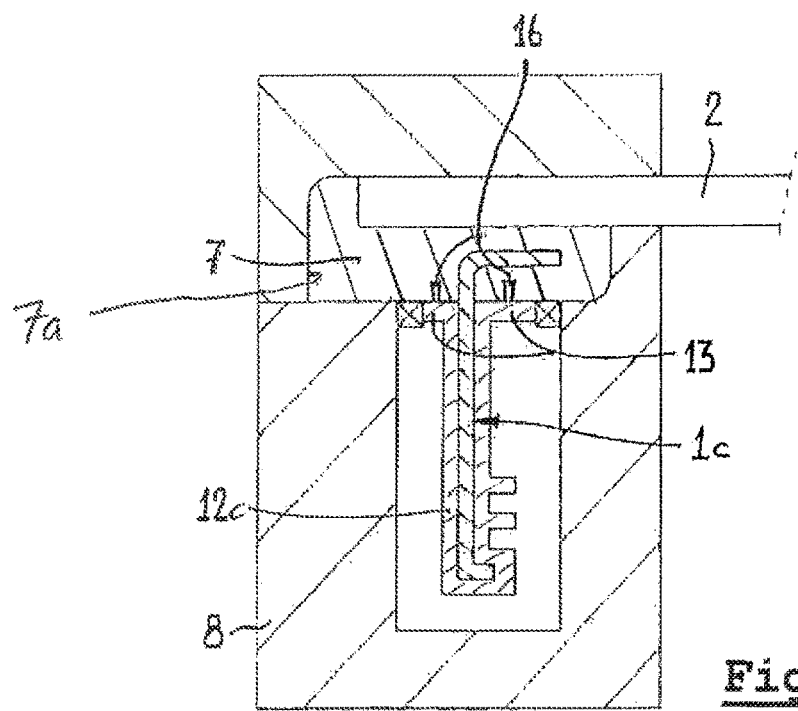
FIG. 4 shows a schematic cross section of a second embodiment of the assembly.

Whereas in the embodiment of FIG. 3 the flange 13 is (an integral) part of the bracket 1b, FIG. 4 illustrates an alternative embodiment in which the flange 13 is formed as an extension of the overmolded part 12c instead of bracket 1c.

Figure 5:
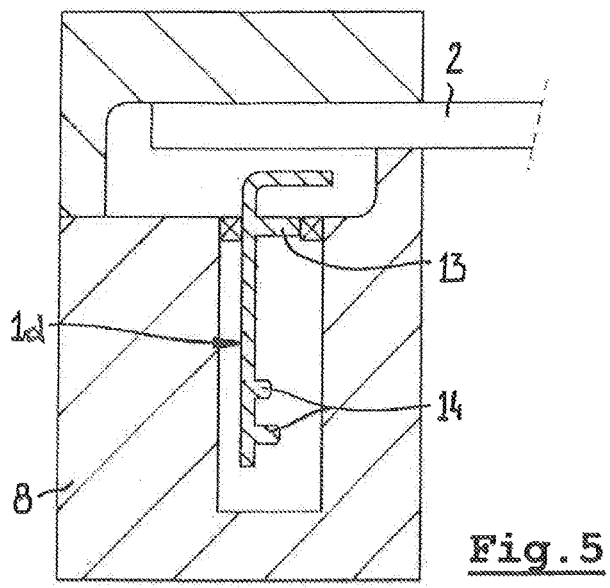
FIG. 5 shows a schematic cross section of a third embodiment of the assembly.

FIG. 5 shows an embodiment in which, again, the flange 13 is an integral part of the bracket 1d (for example extruded therewith as one piece or formed therefrom by folding) but now is provided on one side only of the bracket 1d (for example because the bracket 1d only at that one side is provided with one or more protruding parts 14).

Figures 6A, 6B:
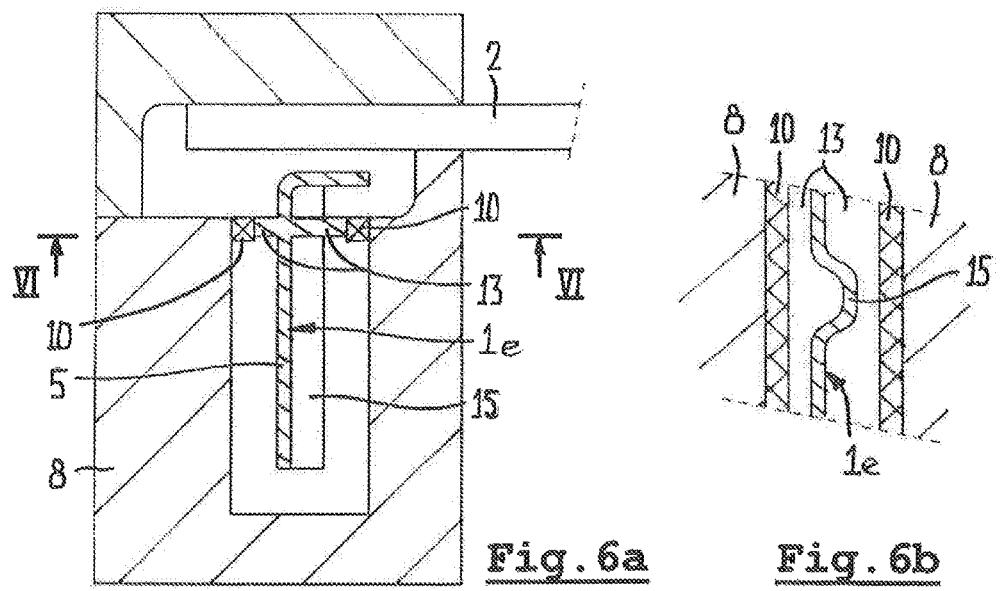

Finally FIGS. 6a and 6b show an embodiment with a bracket 1e comprising at least one undulation 15 extending lengthwise along the second leg 5 of the bracket (that means that in the transverse cross section according to VI-VI as illustrated in FIG. 6b the undulation 15 is visible). Whereas in the state of the art embodiment according to FIGS. 2a and 2b the sealing members 10 of the sealing tool 8 directly engage the bracket 1e and its undulation(s), in the present inventive embodiment the sealing members 10 now engage the flange(s) 13 which define(s) substantially straight lines and as a result minimise(s) the risk of leakage of the encapsulating material which, upon supply, is virtually as fluid as water.

Summarizing the above explanations, aspects of the present invention not only provide an assembly with the mentioned characteristic features, but also a method for making such an assembly (which, therefore, comprises a first constructional part 1 [e.g., 1b;1c;1d;1e] having at least one protruding part 6;12;14;15 and a second constructional part 2 having a surface 4 to which the first constructional part is connected by means of an encapsulating material 7).

The method comprises the step of providing the first constructional part 1 with said flange 13 at a position intended to be in contact with the encapsulating material 7. The moment of providing this flange 13 may be before, during or after the step of positioning the first constructional part 1 onto or near to the surface 4 of the second constructive part 2.

The method further comprises the step of positioning a first end of the first constructional part 1 onto or near to said surface 4 of the second constructional part 2 (this step, therefore, occurring after, during or before the step of providing the flange 13).

Further, a step of engaging the first constructional part 1 and its flange 13 (depending on the construction of the flange 13, the sealer 8;8a,8b;9 may engage the flange 13 only) in a sealing manner with the sealer 8;8a,8b;9 is carried out for creating a receiving space for the encapsulating material 7.

Once such a receiving space has been created, the step of supplying the encapsulating material 7 into said receiving space between said sealer 8;8a,8b;9 and the surface 4 of the second constructional part 2 is carried out, and the encapsulating material 7 will surround at least part of the first end of the first constructional part 1 for securely adhering it to the surface 4 of the second constructional part 2. The encapsulating material 7 will be in contact then with the flange 13.

Finally, after the encapsulating material 7 has cured sufficiently, the step of removing the sealer 8;8a,8b;9 is carried out, after which the assembly is completed.

The invention is not limited to the embodiments described above which may be varied widely within the scope of the invention as defined by the appending claims. Thus the invention also may apply to a first constructional part as illustrated in FIG. 1 with a two-part (or multipart) second leg of which the separate leg parts 5a and 5b are interconnected by fasteners. Basically the first constructional part may have many different shapes. The protruding part or parts may also be very small. In the illustrated embodiments the sealing members of the sealing tool are illustrated to engage outer ends of the flange; it is conceivable, however, that the face of the flange facing away from the surface of the second constructional part, is engaged by said sealing members. Finally, the flange may be provided with projections (16 in FIG. 4) to be embedded in the encapsulating material for improving the strength of the connection between the first and second constructional parts.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An assembly comprising a first constructional part comprising a bracket and a second constructional part comprising a glass panel, wherein the first constructional part has a first end and an opposite second end connected by a central part extending perpendicularly to a surface of the second constructional part, wherein the first end of the first constructional part is connected to said surface of the second constructional part with an encapsulating material at least partly surrounding said first end and adhering to said surface of the second constructional part and wherein the first constructional part between the first end and the opposite second end is provided with at least one protruding part, wherein the first constructional part in contact with the encapsulating material is provided with a flange which is an integral part of the first constructional part comprising a single unitary body, wherein a vertical projection of the flange on said surface of the second constructional part is larger than a vertical projection of the at least one protruding part on said surface of the second constructional part, and wherein the flange is shaped such that during manufacture of the assembly, the flange is engaged in a sealing manner by a sealing tool for defining with the flange, the sealing tool, and the second constructional part a sealed receiving cavity for the encapsulating material, wherein the at least one protruding part is outside the sealed receiving cavity.

2. The assembly according to claim 1, wherein the at least one protruding part is a separate part connected to the first constructional part and wherein the flange is formed as an extension of said separate part.

3. The assembly according to claim 2, wherein said separate part is connected to the first constructional part by overmolding.

4. The assembly according to claim 1, wherein the flange defines a contour comprising a number of straight lines.

5. The assembly according to claim 4, wherein the flange defines a rectangular or square contour.

6. The assembly according to claim 1, wherein the flange is provided with projections to be embedded in the encapsulating material and configured to strengthen a connection between the first and second constructional parts.

7. An assembly comprising a first constructional part comprising a bracket and a second constructional part comprising a glass panel, wherein the first constructional part has a first end and an opposite second end connected by a central part extending perpendicularly to a surface of the second constructional part, wherein the first end of the first constructional part is connected to said surface of the second constructional part with an encapsulating material at least partly surrounding said first end and adhering to said surface of the second constructional part and wherein the first constructional part between the first end and the opposite second end is provided with at least one protruding part, wherein the first constructional part in contact with the encapsulating material is provided with a flange which is an integral part of the first constructional part comprising a single unitary body, wherein a vertical projection of the flange on said surface of the second constructional part completely covers a vertical projection of the at least one protruding part on said surface of the second constructional part, and wherein the flange is shaped such that during manufacture of the assembly, the flange is engaged in a sealing manner by a sealing tool for defining with the flange, the sealing tool, and the second constructional part a sealed receiving cavity for the encapsulating material, wherein the at least one protruding part is outside the sealed receiving cavity, and wherein the bracket at the first end comprises a first leg extending in parallel to the surface of the glass panel and encapsulated by the encapsulating material, and a second leg connected to the first leg defining the central part, wherein said second leg is provided with the at least one protruding part.

8. The assembly according to claim 7, wherein the at least one protruding part defines at least one part of a moving mechanism.

9. The assembly according to claim 7, wherein the at least one protruding part is defined by an undulated shape of the second leg, as seen in a transverse cross section of the second leg.

* * * * *